(No Model.)
F. C. CHAPMAN.
PRUNE DIPPER.
No. 597,633.  Patented Jan. 18, 1898.
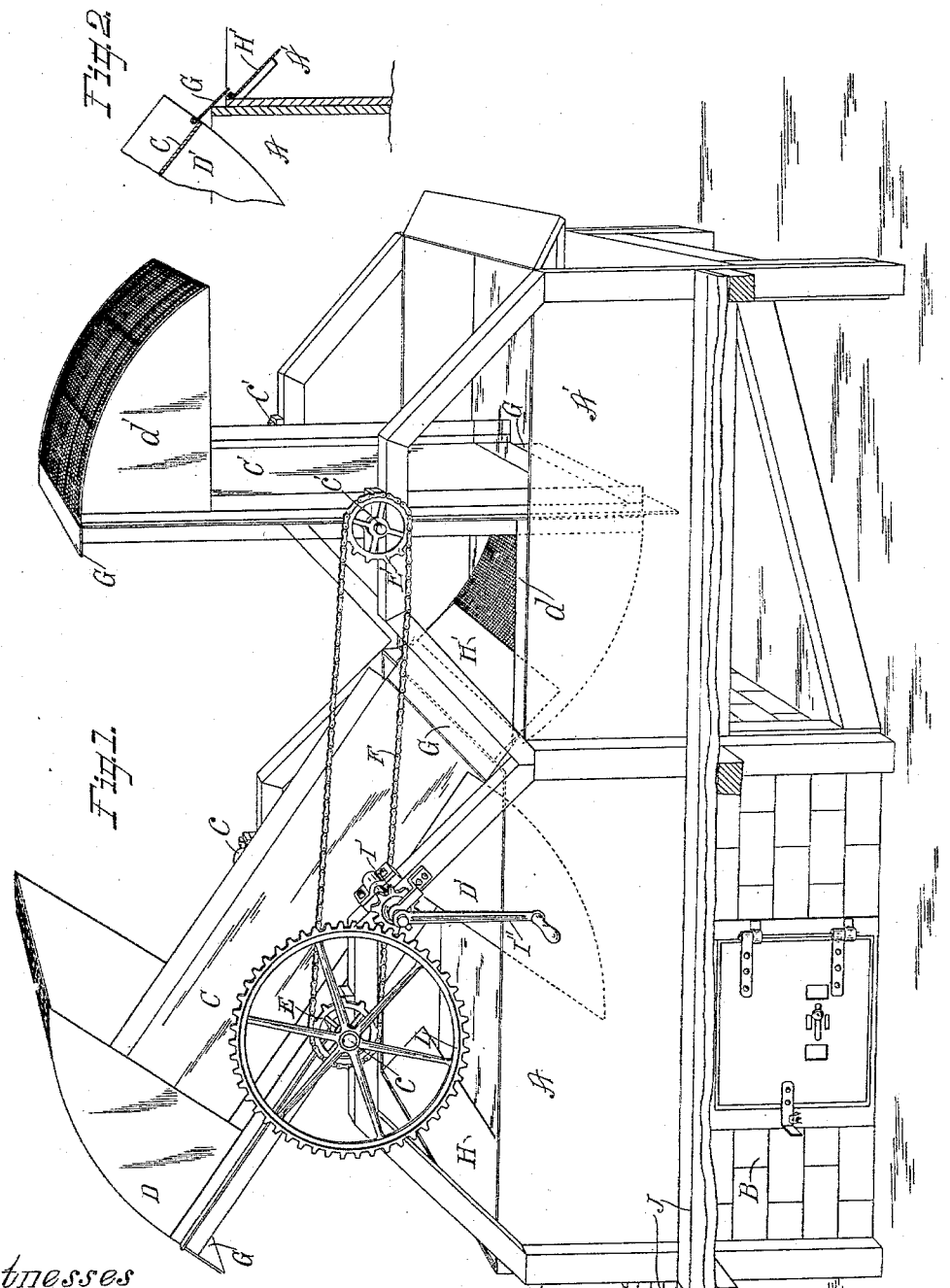
Witnesses
Perry Lingman
Alfred S. Townsend
Inventor
Frank C. Chapman
by Hazard Townsend
his Atty

UNITED STATES PATENT OFFICE.

FRANK C. CHAPMAN, OF LOS ANGELES, CALIFORNIA.

PRUNE-DIPPER.

SPECIFICATION forming part of Letters Patent No. 597,633, dated January 18, 1898.

Application filed March 10, 1897. Serial No. 626,856. (No model.)

*To all whom it may concern:*

Be it known that I, FRANK C. CHAPMAN, a citizen of the United States, residing at Los Angeles, in the county of Los Angeles and State of California, have invented a new and useful Prune-Dipper, of which the following is a specification.

My invention relates particularly to those devices which are used for dipping prunes in lye for the purpose of checking or cracking the skins and then rinsing them in water before spreading them out to dry.

My invention is also adapted for use in redipping prunes after they have been dried for the purpose of softening the skins and washing impurities therefrom.

The object of my invention is to produce a device of this character which will be simple in construction, will be adapted to be operated by one man or by power, as may be desired, and will dip large quantities of fruit within a short period of time.

It is essential, in order to successfully dip prunes rapidly, that the lye be kept very hot. This is difficult to accomplish without having a vat with a large area exposed to the heat, since the prunes rapidly abstract the heat from the lye and reduce the temperature to such an extent as to necessitate leaving the prunes in the lye for a considerable length of time before the skins become sufficiently checked or cracked to allow them to dry. It is also necessary, in order to gain rapidity of action, that the prunes be transferred from the lye-dipping receptacle to a separate rinsing-receptacle; otherwise almost as much time is consumed in rinsing the fruit as is consumed in dipping the fruit in the lye, so that thereby practically twice as much time must elapse between the charges as is necessary where the fruit is discharged from the lye-dipping receptacle as soon as it is sufficiently checked and the receptacle placed in position to receive a fresh charge.

With baskets which are pivoted to one side of a vat and are swung upon their pivots to dip the fruit and discharge it therefrom it is practically impossible to make a vat having sufficient heating-surface to keep the lye hot enough for rapid work, since the basket must extend from one side of the vat to the other in order that the workmen can stand at the side of the vat and place the fruit in the basket. If the vat is made wide, the basket must be made correspondingly wide and the distance from the fulcrum of the weight to be lifted correspondingly increased, thus adding greatly to the labor of dipping the fruit.

My invention differs from all machines of this character heretofore produced in that I journal fruit-conducting chutes above vats by means of journals arranged substantially near the mid-length of the chutes and of the vats, and I secure to the opposite ends of each chute and upon opposite sides thereof fruit-holding baskets which are each adapted to pass down into its respective vat, entering the vat from one side thereof, receive a charge of fruit, pass on up out of the other side of the vat, and as the chute rotates to bring the filled basket above the axis of the chute the basket is emptied by the fruit rolling from the basket down the chute and into one of the baskets of the other chute, which at this juncture is arranged in proper position in the other vat to receive it.

My baskets revolve about the pivotal axis of the chutes and do not reciprocate up and down upon pivotal supports, as has heretofore been the custom, and thereby the baskets sweep through the vat to bring them into proper position to receive the fruit, and the vats may be made much wider than is possible with the form heretofore employed and thereby greater heating-surface and consequent increase of capacity secured.

My invention comprises the various features of construction and combinations of parts hereinafter set forth whereby I produce a dipper of simplicity and cheapness, but capable of handling a large amount of fruit within a short period of time.

The accompanying drawings illustrate my invention.

Figure 1 is a perspective view of a prune-dipper embodying my invention. Fig. 2 is a fragmental sectional view showing the pivoted fruit-conducting flaps.

In the drawings, A represents a vat for containing lye, and A' represents a vat for containing water. The vat A is heated in the ordinary manner by means of a furnace B.

C C' represent fruit-conducting chutes. The chute C is journaled above the vat A, and the chute C' is journaled above the vat A'. Each chute is journaled to revolve by means of journals c c', respectively arranged practically at the mid-length of the chute and of the vat. The chute C is provided with two baskets D and D', arranged upon the opposite ends of the chute and upon opposite sides thereof, so that the chute forms the rear wall of each basket. The chute C' has two baskets d d', which are arranged in a similar manner.

The chutes C and C' are connected with each other by means of sprocket-wheels E E' and a sprocket-chain F, so that the chutes are thereby rotated in proper relation with each other. To each end of each chute is secured a hinged flap or gate G, which, when the chute in the course of its revolution about its axis passes beyond the horizontal line in its upward movement, swings downward and projects outward to bridge the gap between the end of the chute and the edge of the vat. The flaps upon the chute C project across the space between the two vats, so as to readily conduct the fruit as it passes down the chute C into one of the baskets of the chute C'. The vats A and A' are each provided upon the inside of the front edge with a hinged flap H H', which extends down into the vat at an inclination with the wall thereof and is adapted to extend into the baskets and to be lifted thereby into a vertical position as each basket passes upward out of the vat, thus to serve to conduct the prunes into the basket.

I is a power-wheel which is operated by means of a pinion I' and a crank I''; but any suitable gearing and power may be used without departing from the spirit of my invention.

In practice one operator stands upon the platform J at the side of the vat A and when one of the baskets is in proper position to receive the fruit empties the fruit thereinto, preferably from eighty to one hundred pounds at a charge. The fruit is allowed to remain in the lye a sufficient length of time to thoroughly check or crack the skins. Ordinarily with my improved construction this is but a few seconds, owing to the fact that I am enabled to provide a vat having a bottom of large superficial area, which gives me greater heating-surface and enables me to maintain the lye at a higher temperature than is possible with those dippers which reciprocate instead of rotate. Hot lye will crack the skins in much less time than cold or moderately hot lye. As soon as the fruit-skins are sufficiently cracked the crank is operated to revolve the chute C and carry the filled basket upward out of the vat. As soon as the chute passes the horizontal and acquires a sufficient inclination the prunes roll down the chute and out upon the flap or gate G across the space between the two vats and into one of the baskets of the chute C', which is so arranged as to be presented in proper position at this juncture. The prunes falling into the water in the other vat are sufficiently rinsed thereby, and the rotation of the crank is continued to carry the basket containing the rinsed prunes up out of the vat A', lifting the hinged flap H' out of the way as it does so. When the chute C' by its rotation becomes sufficiently inclined, the washed prunes roll out of the basket and down the chute upon the hinged flap and out of the machine to the spreading device. (Not shown.)

It is obvious that my device may be used with only one basket upon each chute, excepting that its capacity would be thereby lessened. In practical operation during the past season I have without difficulty with one of my improved machines dipped eighty tons of prunes in one day of ten hours, and when plenty of prunes could be obtained dipped ten tons within an hour.

My machine is especially desirable for redipping prunes to soften the skins, in that the baskets may be made of any size desired and from five hundred to one thousand pounds of prunes dipped at one time. The redipping is slower than the first dipping for the reason that the prunes must remain in the water a sufficient length of time to thoroughly soften the impurities and allow them to be washed from the fruit. With my device the proportions of the pinion and cog-wheel may be regulated so that one man can operate the machine with any desired quantity of fruit in the basket, which is a great advantage over any other machine of this class of which I am aware.

Now, having described my invention, what I claim as new, and desire to secure by Letters Patent, is—

1. The combination set forth of a fruit-conducting chute journaled to revolve by journals arranged near the mid-length of the chute; a fruit-holding basket secured to and projecting from one side of one end of the chute; a vat through which the basket passes; a flap hinged to the end of the chute to bridge the gap between the end of the chute and the edge of the vat; and means for rotating the chute and the basket to cause the basket to enter the vat from one side thereof, and to emerge from the other.

2. In a fruit-dipper, the combination set forth of a fruit-conducting chute journaled to revolve by journals arranged near the mid-length of the chute; a fruit holding and dipping basket secured to each end of the chute and projecting upon opposite sides thereof; a vat through which the baskets pass when the chute is revolved; flaps pivoted to the chute to bridge the gap between the ends of the chute and the side of the vat; and means for revolving the chute.

3. In a fruit-dipper, the combination set forth of two vats arranged side by side; two fruit-conducting chutes, arranged one above each vat and each journaled to revolve by means of journals arranged near the mid-length of the chute; a fruit dipping and holding basket secured to each chute at one end thereof; and means arranged to rotate the chutes so that the basket which passes through one vat will receive the fruit discharged from the other basket when the chute is rotated, and will carry such fruit upward out of the vat and discharge it from the machine.

4. In a fruit-dipper, the combination set forth of two vats arranged side by side; two fruit-conducting chutes, one for each vat, each journaled to revolve by journals arranged near the mid-length of the chute; two baskets secured to each chute upon opposite sides thereof; and suitable means for revolving the chutes with such relation to each other that a basket of the second chute will receive the fruit discharged from the basket of the first chute and will in turn conduct it from the machine.

5. A fruit-dipping machine comprising two vats arranged side by side; two fruit-conducting chutes; one journaled upon each vat by journals arranged near the mid-length of the chute; two baskets secured to each chute and upon opposite sides thereof; means for rotating the chutes; and a pivoted flap adapted to bridge the space between the vats when the fruit is being discharged from one basket into another.

6. A fruit-dipping machine comprising two vats; baskets secured to rotating arms adapted to carry the baskets through the vats and arranged with such relation to each other that a basket in the second vat will receive the fruit discharged from a basket in the first vat and in turn conduct the fruit from the machine; and pivoted flaps for bridging the space between the baskets.

7. The combination set forth of the vats; the rotating chutes; the baskets secured to the chutes at opposite ends and upon opposite sides thereof; the pivoted flap hinged to each end of each chute; and the pivoted flap hinged to the rear side of each vat and adapted to project into the basket and to be lifted thereby as the basket is swung out of the vat.

8. In a fruit-dipper provided with rotating arms carrying fruit-dipping baskets, the combination set forth of movable flaps adapted to bridge the space between the vats.

9. In a fruit-dipper provided with fruit-dipping baskets, the combination of the movable flap hinged to the rear bottom side of each basket and the movable flap hinged to the rear side of the last vat and adapted to project into and to be swung by the basket as it passes out of the vat.

10. In a fruit-dipper, the combination set forth of two tanks arranged side by side; two fruit-conducting chutes, one journaled above each tank by journals arranged near the mid-length of the chute; fruit-dipping baskets secured to each end of each chute and projecting upon opposite sides thereof.

F. C. CHAPMAN.

Witnesses:
ALFRED I. TOWNSEND,
JAMES R. TOWNSEND.